(12) United States Patent
Kitsunai et al.

(10) Patent No.: US 7,677,134 B2
(45) Date of Patent: Mar. 16, 2010

(54) FORGED PRODUCT AND METHOD OF MAKING THE PRODUCT

(75) Inventors: Toru Kitsunai, Shizuoka (JP); Osamu Matsushita, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 25 days.

(21) Appl. No.: 11/957,612

(22) Filed: Dec. 17, 2007

(65) Prior Publication Data
US 2008/0149231 A1 Jun. 26, 2008

(30) Foreign Application Priority Data
Dec. 20, 2006 (JP) .............................. 2006-342199

(51) Int. Cl.
- *B62K 21/12* (2006.01)
- *C22F 1/06* (2006.01)
- *C22C 23/00* (2006.01)
- *B21D 53/86* (2006.01)

(52) U.S. Cl. ...................... 74/551.8; 148/667; 148/666; 148/420; 29/897.2

(58) Field of Classification Search ................. 148/666, 148/667; 74/551.8; 29/897.2
See application file for complete search history.

(56) References Cited

U.S. PATENT DOCUMENTS

| 5,409,555 | A | 4/1995 | Fujita et al. |
| 5,902,424 | A | 5/1999 | Fujita et al. |
| 6,143,097 | A | 11/2000 | Fujita et al. |
| 6,953,201 | B1 | 10/2005 | VanDeMortel |

FOREIGN PATENT DOCUMENTS

| JP | 04-339534 | A | 11/1992 |
| JP | 09-309480 | A | 12/1997 |
| JP | 10-007065 | A | 1/1998 |
| JP | 11-165684 | A | 6/1999 |
| JP | 2000-42685 | A | 2/2000 |
| JP | 2002-254132 | A | 9/2002 |
| JP | 2006-021639 | A | 1/2006 |

OTHER PUBLICATIONS

Official communication issued in counterpart European Application No. 07024232.6, mailed on Feb. 27, 2008.

*Primary Examiner*—Timothy C Vanoy
*Assistant Examiner*—Daniel Berns
(74) *Attorney, Agent, or Firm*—Keating & Bennett, LLP

(57) ABSTRACT

A forged product is made of a magnesium alloy and includes a through hole making portion to make a through hole that runs in a predetermined direction, and a bottom portion that lies on a plane intersecting with the predetermined direction. The through hole includes a first portion that has been formed by a forging process and a second portion that has been formed after the forging process. The second portion of the through hole has shifted toward the bottom portion with respect to the middle of the through hole in the predetermined direction.

19 Claims, 7 Drawing Sheets

FORGED PRODUCT AND METHOD OF MAKING THE PRODUCT

BACKGROUND OF THE INVENTION

1. Field of the Invention

The present invention relates to a forged product and a method of making such a product.

2. Description of the Related Art

An upper bracket, an under bracket and other supporting members are used as members for fixing the handlebars and front fork of a motorcycle. An example of upper and under brackets (which will be collectively referred to herein as "handlebar supporting members") is shown in FIGS. 8 and 9.

As shown in FIGS. 8 and 9, each of the upper bracket 700 and under bracket 800 includes bosses 2a, 2b and 2c. The bosses 2a and 2b at both ends have through holes 1a and 1b, into which a front fork 30 is inserted. Although the front fork 30 shown in FIG. 9 is inserted into just one of the two through holes 1a and 1b, the front fork 30 is actually inserted into the other through hole 1b as well. Meanwhile, the boss 2c at the center has a through hole 1c, into which a steering shaft 40 is inserted. The rider can turn the front wheel to any direction he or she likes with the handlebars since the front fork 30 and the steering shaft 40 are supported by the upper bracket 700 and the under bracket 800.

To increase the fuel consumption and cut down the exhaust gas, a lot of people think it is important to reduce the overall weight of a motorcycle as much as possible. For that purpose, in the prior art, the upper bracket, under bracket and other handlebar supporting members are made of an aluminum alloy, which has a lighter specific gravity than steel. A handlebar supporting member made of an aluminum alloy is usually formed by subjecting a cast product, which has been formed by a casting process such as die casting, to a T6 heat treatment (including a solution treatment and an artificial aging treatment) in order to increase its mechanical strength.

Meanwhile, methods of making a magnesium alloy, which has an even lighter specific gravity than an aluminum alloy, have been developed. Also, techniques for increasing the strength and machinability of a magnesium alloy have been developed, too. That is why the handlebar supporting members are now preferably made of a magnesium alloy, not an aluminum alloy. The specific gravity of a magnesium alloy is approximately two-thirds of that of an aluminum alloy. For that reason, the weight of a motorcycle can be further reduced by using a magnesium alloy.

If a magnesium alloy is used, however, it is difficult to achieve a sufficient mechanical strength just by subjecting the cast product to a heat treatment. Thus, Japanese Patent Application Laid-Open Publication No. 6-172949 proposes that after a cast product made of a magnesium alloy has been forged, the forged product be subjected to a T6 heat treatment. On the other hand, Japanese Patent Application Laid-Open Publication No. 2002-254132 proposes that after a billet of a magnesium alloy that has been formed by a continuous casting process is subjected to a hot extrusion process, the billet be treated by a solution treatment, a forging process and then an aging treatment in this order. According to any of these techniques disclosed in Japanese Patent Application Laid-Open Publication Nos. 6-172949 and 2002-254132, the mechanical strength can be increased sufficiently by a plastic deformation to be caused by a forging process on the workpiece.

However, the present inventors discovered and confirmed via experiments that when the technique including the forging process as disclosed in Japanese Patent Application Laid-Open Publication Nos. 6-172949 and 2002-254132 was simply applied to making a handlebar supporting member, the workpiece would experience unexpected deformation (or would be bent) at an early stage of the forging process.

If such a deformation were produced in the workpiece, the workpiece would be deformed plastically so much that an increased press tonnage should be applied to get the forging process done and the die would have decreased durability as a result. Also, if such a deformation were produced, the workpiece might sometimes chip (that is, have a shape defect, e.g., an underfill) at the edges. Such chipping could be avoided by subjecting a workpiece that has been formed in a bigger size to a forging process. In that case, as the workpiece has a bigger size than required, an increased amount of burr will be left after the forging process, thus decreasing the yield (also referred to as the "material utilization factor") of the material. On top of that, since a magnesium alloy is much more expensive than an aluminum alloy, such a decrease in material yield would increase the overall manufacturing cost significantly.

One reason why the workpiece has such a deformation is that the through hole of the handlebar supporting member has a portion to be formed by the forging process and another portion to be formed after the forging process. If the handlebar supporting member is made by a method including the forging process, the through hole of the handlebar supporting member is made by making a non-through hole once in a workpiece by the forging process and then removing a bottom portion of the non-through hole by a machining process, for example.

SUMMARY OF THE INVENTION

In order to overcome the problems described above, preferred embodiments of the present invention minimize the unexpected deformation of the workpiece during the forging process while a forged product with a through hole is being made.

The preferred embodiments of the present invention were developed based on the discovery of the inventors of the present application that the location of that portion to be removed to turn the non-through hole into a through hole had a significant influence on the deformation of the workpiece.

A forged product according to a preferred embodiment of the present invention is made of a magnesium alloy and includes: a through hole making portion to make a through hole that runs in a predetermined direction; and a bottom portion that lies on a plane intersecting with the predetermined direction. The through hole includes a first portion that has been formed by a forging process and a second portion that has been formed after the forging process. The second portion of the through hole has shifted toward the bottom portion with respect to the middle of the through hole in the predetermined direction.

In one preferred embodiment, the distance from the middle of the through hole in the predetermined direction to the second portion of the through hole preferably accounts for more than about 70% of the distance from the middle of the through hole in the predetermined direction to the bottom portion.

In another preferred embodiment, the second portion of the through hole is substantially on a level with the bottom portion.

In still another preferred embodiment, as viewed on a plane that intersects with the predetermined direction, the through hole making portion is located outside of the bottom portion with respect to the center of the forged product.

In yet another preferred embodiment, the magnesium alloy preferably has an average crystal grain size of about 150 μm or less, for example.

In yet another preferred embodiment, the forged product of the present invention includes a portion in which the magnesium alloy has an average crystal grain size of about 100 μm or less, for example.

In yet another preferred embodiment, the magnesium alloy preferably includes about 10 mass % or less of aluminum, for example.

In yet another preferred embodiment, the through hole making portion is a boss with a sidewall that surrounds the through hole, and the forged product of the present invention is a handlebar supporting member for motorcycles.

A motorcycle according to another preferred embodiment of the present invention includes a forged product according to any of the above-described preferred embodiments of the present invention.

A handlebar supporting member for motorcycles according to various preferred embodiments of the present invention has been formed by a forging process and includes: a boss with a through hole that runs in a predetermined direction; and a bottom portion that lies on a plane intersecting with the predetermined direction. The through hole includes a first portion that has been formed by the forging process and a second portion that has been formed after the forging process. The second portion of the through hole has shifted toward the bottom portion with respect to the middle of the through hole in the predetermined direction.

A method of making a forged product according to a preferred embodiment of the present invention includes the steps of: preparing a workpiece made of a metallic material; forging the workpiece such that the workpiece has a non-through hole running in a predetermined direction and a bottom portion lying on a plane that intersects with the predetermined direction; and removing a portion of the forged workpiece, thereby turning the non-through hole into a through hole. The step of forging is performed such that the portion of the workpiece to be removed in the step of removing has shifted toward the bottom portion with respect to the middle of the through hole in the predetermined direction.

In one preferred embodiment, as viewed in a direction in which the workpiece is pressed in the step of forging, the workpiece prepared in the step of preparing has substantially the same profile as the workpiece that has been forged in the step of forging.

In another preferred embodiment, the step of preparing the workpiece includes forming the workpiece by an extrusion process.

In still another preferred embodiment, the step of preparing the workpiece includes preparing a workpiece made of a magnesium alloy.

In this particular preferred embodiment, the step of forging preferably includes forging the workpiece at an upset ratio of about 60% or more, for example.

Alternatively or additionally, the step of forging includes forging the workpiece such that the forged workpiece preferably has a thickness of about 1 mm to about 8 mm, for example.

In another preferred embodiment, the step of forging includes forging the workpiece such that a portion of the forged workpiece preferably has a deformation height of about 130% or more, for example.

A through hole of a magnesium alloy forged product according to a preferred embodiment of the present invention includes a first portion that has been formed by a forging process and a second portion that has been formed after the forging process. The second portion has shifted toward the bottom portion with respect to the middle of the through hole in the direction in which the through hole runs. Therefore, in the forging process, there will be a shorter time lag between when the press surface contacts with the workpiece to form the first portion of the through hole and when the press surface contacts with the workpiece to form the bottom portion (compared to the situation where the second portion is located at the middle of the through hole in the direction in which the through hole runs). Consequently, the unwanted deformation of the workpiece that would otherwise be caused due to the time lag can be reduced, the press tonnage required to get the forging process done can also be reduced, and the durability of the die can be increased. In addition, chipping can be minimized and the material yield can be increased.

If the distance from the middle of the through hole in the direction in which the through hole runs to the second portion of the through hole accounts for more than about 70% of the distance from the middle of the through hole in that direction to the bottom portion, the time lag can be reduced so significantly that the unwanted deformation of the workpiece can be reduced effectively enough.

If the second portion of the through hole (that has been formed after the forging process) is substantially on a level with the bottom portion, the time lag can be reduced to almost zero and the press surface for forming the first portion and the press surface for forming the bottom portion can contact with the workpiece substantially at the same time. As a result, the deformation of the workpiece can be reduced significantly.

The workpiece is particularly likely to be deformed and cause chipping accordingly in an arrangement in which as viewed on a plane on which the bottom portion lies, the through hole making portion is located outside of the bottom portion with respect to the center of the forged product. That is why it would be very much meaningful to apply preferred embodiments of the present invention to such an arrangement.

Due to plastic deformation caused by the forging process, the magnesium alloy comes to have a decreased average crystal grain size. The magnesium alloy preferably has an average crystal grain size of about 150 μm or less. By defining the average crystal grain size to be about 150 μm or less, a forged product can gain as high mechanical strength as an aluminum alloy cast product which has been subjected to a T6 heat treatment.

Also, the forged product according to a preferred embodiment of the present invention preferably includes a portion in which the magnesium alloy has an average crystal grain size of about 100 μm or less, for example. By decreasing the average crystal grain size of a portion, which should undergo a lot of stress, to about 100 μm or less, the mechanical strength of that portion can be further increased and eventually the forged product can have increased durability.

The magnesium alloy preferably includes about 10 mass % or less of aluminum, for example. This is because if the aluminum content exceeded about 10 mass %, a β phase would nucleate, thus decreasing the forgeability and the toughness of the resultant forged product.

A forged product according to a preferred embodiment of the present invention may be a handlebar supporting member (such as an upper bracket or an under bracket) for motorcycles, for example. Such a handlebar supporting member has a boss with a through hole, into which a front fork or a steering shaft is inserted (such a boss will be referred to herein as a "through hole making portion"). That is why preferred embodiments of the present invention are effectively applicable to such a member.

A motorcycle according to another preferred embodiment of the present invention includes a forged product made of a magnesium alloy according to any of the above-described preferred embodiments of the present invention, and therefore, can have a lighter weight with the increase in manufacturing cost minimized.

A through hole of a handlebar supporting member according to a preferred embodiment of the present invention includes a first portion that has been formed by a forging process and a second portion that has been formed after the forging process. The second portion has shifted toward the bottom portion with respect to the middle of the through hole that is defined in the direction in which the through hole runs. Consequently, there will be a much shorter time lag between when the press surface contacts with the workpiece to form the first portion of the through hole and when the press surface contacts with the workpiece to form the bottom portion in the forging process. As a result, the unwanted deformation of the workpiece that would otherwise be caused due to such a time lag can be reduced, the press tonnage required to get the forging process done can also be reduced, and the durability of the die can be increased. In addition, chipping can be minimized and the material yield can be increased.

In a method of making a forged product according to a preferred embodiment of the present invention, the step of forging is performed such that a portion of the workpiece to be removed in the step of removing has shifted toward the bottom portion with respect to the middle of the through hole that is defined in the direction in which the through hole runs. Consequently, there will be a much shorter time lag between when the press surface contacts with the workpiece to form a non-through hole and when the press surface contacts with the workpiece to form the bottom portion in the forging process. As a result, the unwanted deformation of the workpiece that would otherwise be caused due to such a time lag can be reduced, the press tonnage required to get the forging process done can also be reduced, and the durability of the die can be increased. In addition, chipping can be minimized and the material yield can be increased.

As viewed in a direction in which the workpiece is pressed in the step of forging (i.e., a forging direction), the workpiece prepared in the step of preparing preferably has substantially the same profile as the workpiece that has been forged in the step of forging. In this manner, by preparing a workpiece that has substantially the same profile as the workpiece that has been forged when viewed in the forging direction, the forging process needs to be performed a decreased number of times (e.g., only once). As a result, the manufacturing cost can be reduced. In addition, since the amount of burr remaining decreases, the material yield increases. Such a workpiece may have been formed by an extrusion process, for example. A workpiece formed by an extrusion process has its crystal grain size decreased by the extrusion process, and therefore, has a high degree of forgeability and can be used effectively.

Since a magnesium alloy is an expensive material, a method of making a forged product according to a preferred embodiment of the present invention can be applied particularly effectively to a situation where the workpiece is made of a magnesium alloy.

The step of forging is preferably performed at an upset (forging) ratio of about 60% or more, for example. By defining the upset ratio to be about 60% or more, the average crystal grain size of the magnesium alloy can be reduced sufficiently. As a result, a forged product can gain as high mechanical strength as an aluminum alloy cast product which has been subjected to a T6 heat treatment.

To reduce the average crystal grain size of the magnesium alloy sufficiently by causing a good plastic deformation of the workpiece, the step of forging is preferably performed such that the forged workpiece has a thickness of about 1 mm to about 8 mm and that a portion of the forged workpiece has a deformation height of about 130% or more, for example.

According to various preferred embodiments of the present invention, when a forged product with a through hole is being made, the unwanted deformation of the workpiece can be reduced during the forging process.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, preferred embodiments of the present invention will be described with reference to the accompanying drawings. In the following description, the present invention is preferably applied to an upper bracket as a handlebar supporting member for motorcycles. However, the present invention is in no way limited to such a specific preferred embodiment. That is to say, the present invention is also applicable to an under bracket or any other forged product with a through hole (such as a car body frame) in general.

Figure 1A:
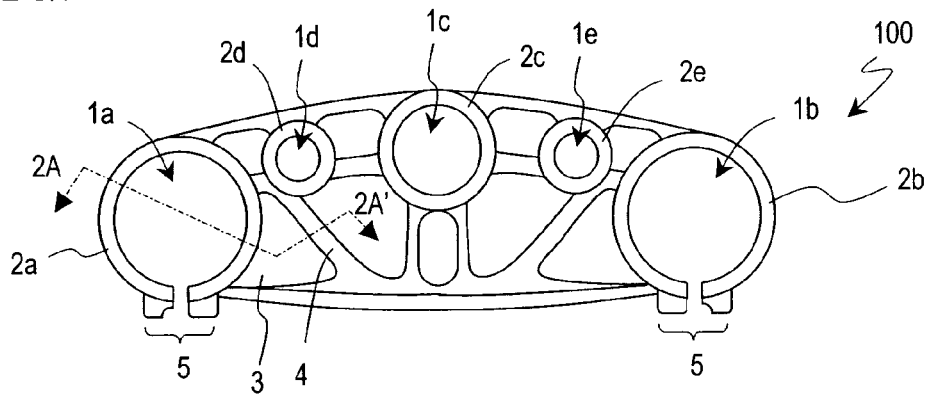
FIGS. 1A and 1B are respectively a top view and a bottom view schematically illustrating an upper bracket 100 according to a preferred embodiment of the present invention.
Figure 1B:
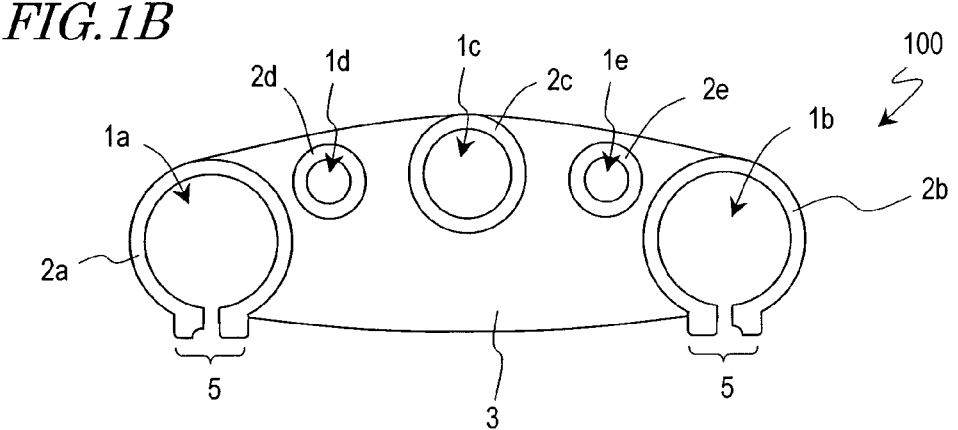
Figure 2:
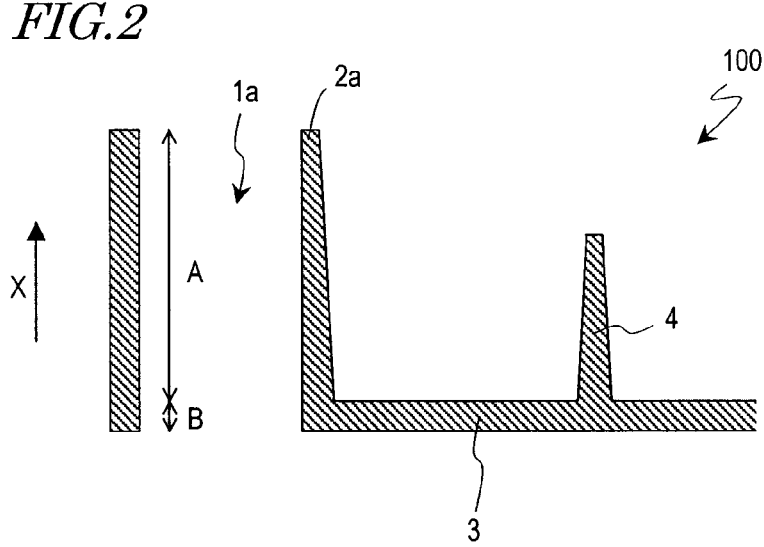
FIG. 2 is a cross-sectional view schematically illustrating the upper bracket 100 of the preferred embodiment of the present invention.

FIGS. 1A, 1B and 2 illustrate an upper bracket 100 according to a preferred embodiment of the present invention. Specifically, FIGS. 1A and 1B are respectively a top view and a bottom view schematically illustrating the upper bracket 100 and FIG. 2 is a cross-sectional view thereof as viewed on the planes 2A-2A' shown in FIG. 1A.

The upper bracket 100 is a forged product made of a magnesium alloy, which typically includes aluminum and zinc. Also, the magnesium alloy preferably gets flame-retarded by including calcium.

The upper bracket 100 includes through hole making portions 2a to 2e with through holes 1a to 1e. The direction in which these through holes 1a to 1e run (as pointed by the arrow X in FIG. 2) is parallel or substantially parallel to the center axis of the through holes 1a to 1e. That is why the direction X in which these through holes 1a to 1e run will be simply referred to herein as an "axial direction".

The through hole making portions 2a to 2e are bosses, each having a sidewall that surrounds its associated through hole 1a to 1e. A front fork will be inserted into the through holes 1a and 1b of the through hole making portions 2a and 2b that are located at both ends of the upper bracket 100 in the longitudinal direction. The through hole making portions 2a and 2b have a fastening structure 5 for fastening the through holes 1a and 1b. The fastening structure 5 has a screw hole, and by inserting a bolt into the screw hole, the through holes 1a and 1b can be screwed up.

A steering shaft will be inserted into the through hole 1c of the through hole making portion 2c that is located at the center of the upper bracket 100 in the longitudinal direction. Also, the through holes 1d and 1e of the other through hole making portions 2d and 2e are provided to fix a member for supporting the handlebars.

The upper bracket 100 further includes a bottom portion 3 that lies on a plane that intersects with the axial direction X (at right angles, in this example) and a raised portion 4 that protrudes upward from the bottom portion 3.

The bottom portion 3 is a plate like member that is arranged to support the entire upper bracket 100. The raised portion 4 is a rib that reinforces the bottom portion 3 and has been formed so as to connect all of these through hole making portions 2a to 2e together.

As shown in FIG. 2, each of the through holes 1a to 1e includes a first portion A that has been formed by a forging process and a second portion B that has been formed after the forging process. The first portion A is formed by utilizing plastic deformation during the forging process. That is to say, the first portion A corresponds to a non-through hole to be formed by the forging process. On the other hand, the second portion B is formed by removing the bottom of the non-through hole, which has been formed during the forging process, by a machining process or the like after the forging process. This second portion B will also be referred to herein as a "punched portion". The first portion A and the second portion (or punched portion) B can be easily recognized by observing the fiber flows on the through hole making portions 2a to 2e.

In this preferred embodiment, the punched portion B of the through holes 1a to 1e is substantially on a level with the bottom portion 3 as shown in FIG. 2. That is to say, the punched portion B has shifted toward the bottom portion 3 with respect to the middle of the through hole in the axial direction X.

In the upper bracket 100 of this preferred embodiment, the punched portion B is located at such a position, thus minimizing the unwanted deformation (or bend) of the workpiece at an early stage of the forging process. This point will be described in further detail.

Figure 3A:
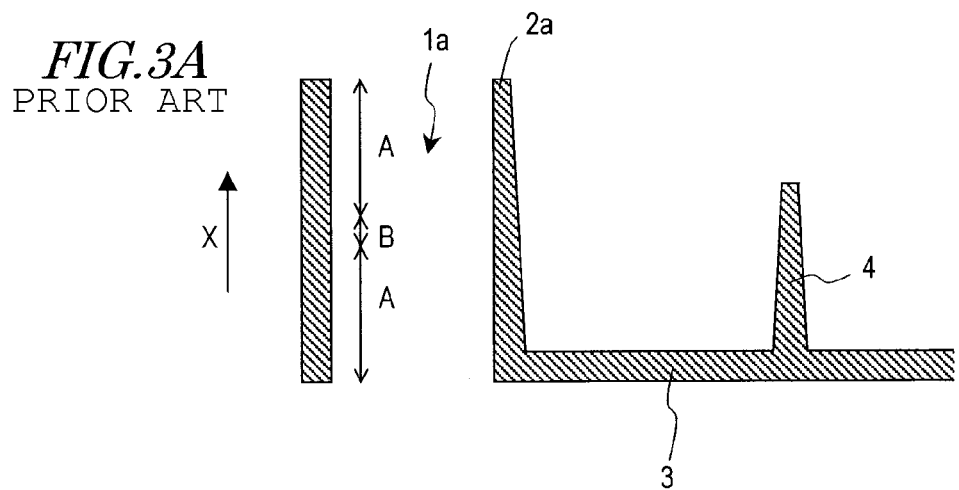
FIGS. 3A, 3B and 3C are cross-sectional views schematically illustrating a structure that was designed to form a through hole punched portion at the middle of the hole in the axial direction, a workpiece just obtained by subjecting the structure shown in FIG. 3A to a forging process, and a casting die for forming the structure shown in FIG. 3A, respectively.
Figure 3B:
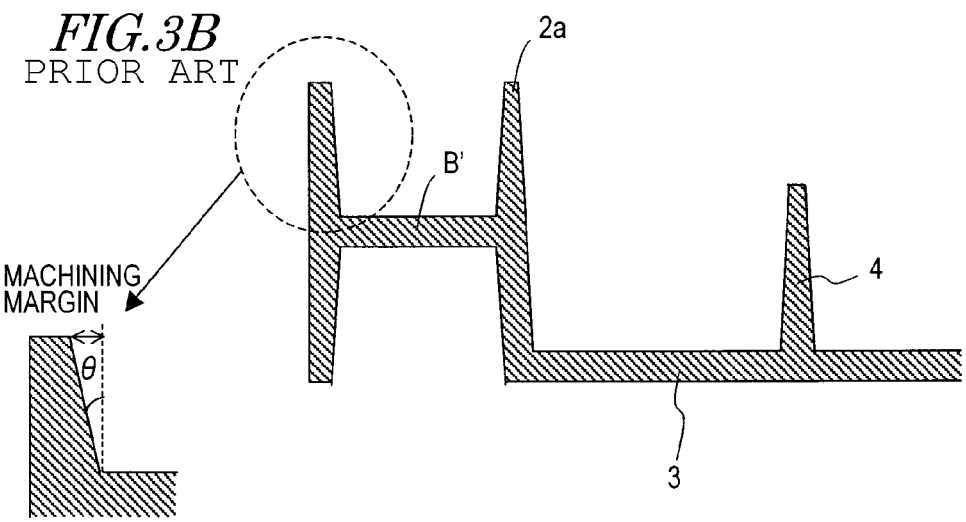

If the method including the forging process as disclosed in Japanese Patent Application Laid-Open Publication Nos. 6-172949 and 2002-254132 were simply applied to making a handlebar supporting member, then the punched portion B would be located at the middle of hole in the axial direction X as shown in FIG. 3A in order to reduce the machining margin involved with a punching gradient. As shown in FIG. 3B, the workpiece that has just been forged (i.e., when a portion B' corresponding to the punched portion B is still attached) has a punching gradient θ (of about 3 degrees, for example) to release the product from the forging die easily. The machining margin involved with the punching gradient θ is an excessive portion so to speak that will be removed by a machining process after the forging process. If such a punched portion B is located at the middle of the through hole in the axial direction X, the machining margin can be the smallest.

Figure 3C:
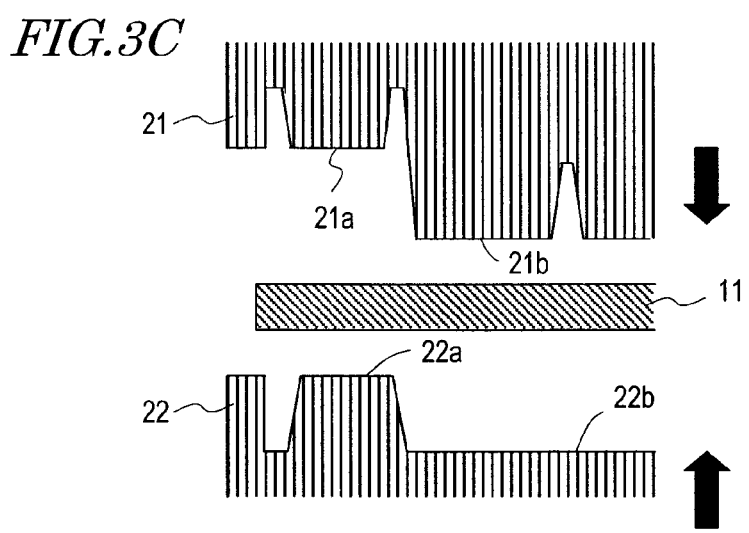

If the punched portion B is located at the middle of the through hole in the axial direction X, however, the location of the portion B' to be removed to make the punched portion B is quite different from that of the bottom portion 3 in the axial direction X (i.e., the press direction during the forging process) as can be seen from FIG. 3B. That is why there will be a significant time lag between when the press surface contacts with the workpiece for the first time to form the first portion A and when the press surface contacts with the workpiece for the first time to form the bottom portion 3. Specifically, as for the upper forging punch 21, the press surface 21b to form the bottom portion 3 will contact with the workpiece 11 much earlier than the press surface 21a to form the first portion A as shown in FIG. 3C. On the other hand, as for the lower forging punch 22, the press surface 22a to form the first portion A will contact with the workpiece 11 much earlier than the press surface 22b to form the bottom portion 3 as shown in FIG. 3C. Such a time lag will produce unwanted deformation (bend) in the workpiece.

If such a deformation were produced in the workpiece, the workpiece would be deformed plastically so much that an increased press tonnage should be applied to get the forging process done and the die would have decreased durability as a result. Also, if such a deformation were produced, the workpiece might sometimes chip at the edges. Such chipping could be avoided by subjecting a workpiece that has been formed in a bigger size to a forging process. In that case, as the workpiece has a bigger size than required, an increased amount of burr will be left after the forging process, thus decreasing the yield of the material. On top of that, since a magnesium alloy is much more expensive than an aluminum alloy, such a decrease in material yield would increase the overall manufacturing cost significantly.

On the other hand, in the upper bracket 100 of this preferred embodiment, the punched portion B has shifted toward the bottom portion 3 with respect to the middle of the through hole in the axial direction X (i.e., the direction in which the through hole 1a runs), and therefore, there will be a much shorter time lag between when the press surface contacts with the workpiece to form the first portion A and when the press surface contacts with the workpiece to form the bottom portion 3. Consequently, the unwanted deformation of the workpiece can be reduced, the press tonnage required to get the forging process done can also be reduced, and the durability of the die can be increased. In addition, chipping can be minimized and the material yield can be increased.

On top of that, if the punched portion B is substantially on a level with the bottom portion 3 as shown in FIG. 2, the time lag can be reduced to almost zero and the press surface for forming the first portion A and the press surface for forming the bottom portion 3 can contact with the workpiece substantially at the same time. As a result, the deformation of the workpiece can be reduced significantly.

Figure 4A:
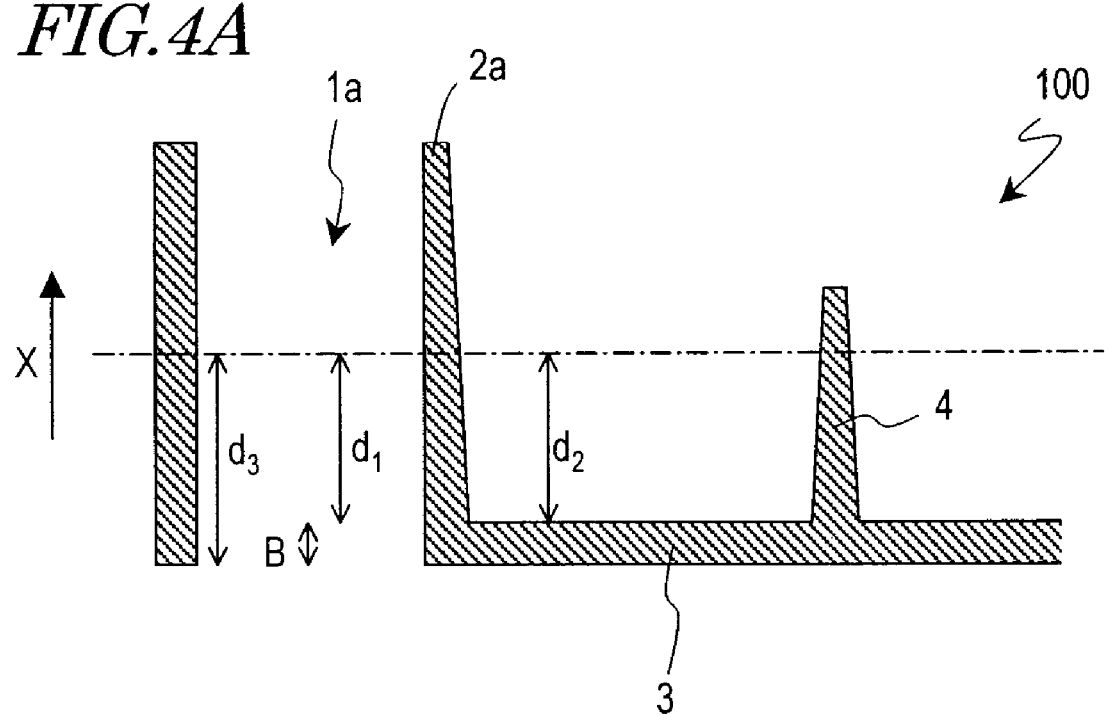
FIGS. 4A and 4B are cross-sectional views schematically illustrating upper brackets 100 according to preferred embodiments of the present invention.

Naturally, the present invention is in no way limited to the arrangement shown in FIG. 2. But the effect of reducing the deformation of the workpiece can be achieved as long as the punched portion B has shifted toward the bottom portion 3 with respect to the middle of the through hole in the axial direction X. To increase that effect, however, the punched portion B is preferably as close to the bottom portion 3 as possible. If the distance from the middle of hole in the axial direction X (as indicated by the one-dot chain) to the punched portion B is identified by $d_1$ and if the distance from the middle of the through hole in the axial direction X to the bottom portion 3 is identified by $d_2$ as shown in FIG. 4A, the distances $d_1$ and $d_2$ preferably satisfy the inequality $d_1>0.7d_2$ (i.e., the distance $d_1$ preferably accounts for more than about 70% of the distance $d_2$, for example). More preferably, the distances $d_1$ and $d_2$ are preferably substantially equal to each other as shown in FIG. 4A (more specifically, satisfy the inequality $d_1>0.9d_2$). If the distances $d_1$ and $d_2$ satisfy the inequality $d_1>0.7d_2$, the deformation of the workpiece can be reduced significantly. And if the distances $d_1$ and $d_2$ are substantially equal to each other, the deformation of the workpiece can be reduced even more significantly. It should be noted that if the distance from the middle of the through hole in the axial direction to the lowest point of the forged product is identified by $d_3$, the distance $d_1$ never exceeds the distance $d_3$ (i.e., $d_1<d_3$ is always satisfied).

Figure 4B:
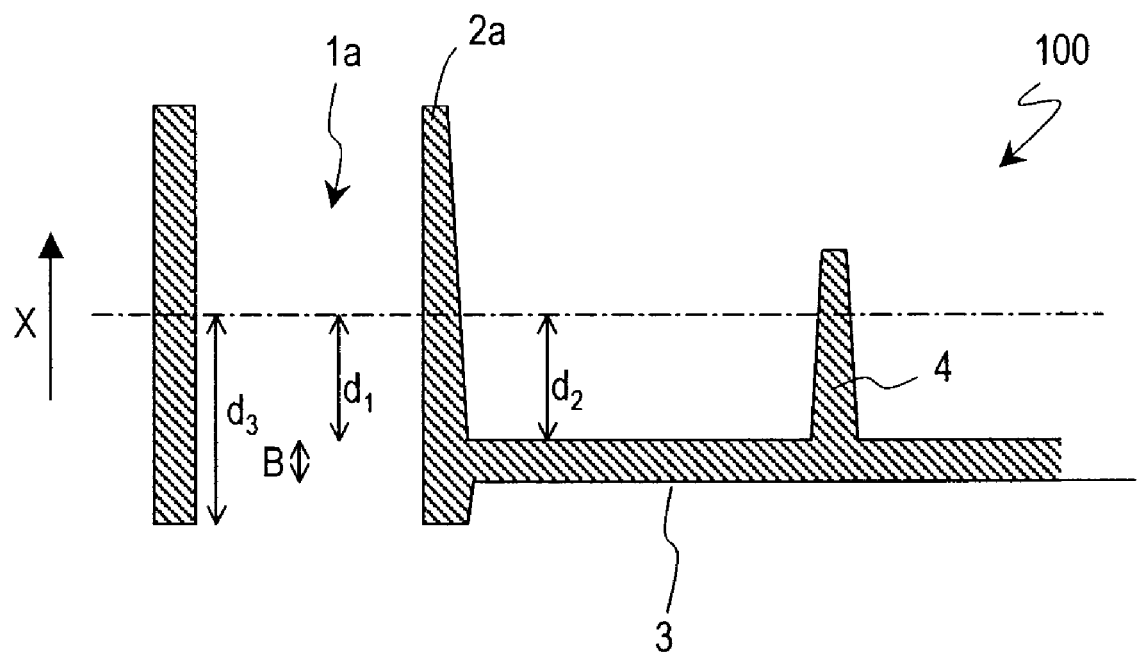

Also, the bottom portion 3 may support the entire upper bracket 100 and may be the bottom of a recess that is defined between the through hole making portion (i.e., the boss) 2a and the raised portion (rib) 4. Therefore, the bottom portion 3 does not always have to be located at the lowest level in the axial direction X as shown in FIGS. 2 and 4A but may be located over the lowest level in the axial direction X as shown in FIG. 4B. However, the bottom portion 3 is never on a level with the middle of the through hole in the axial direction X.

Due to plastic deformation caused by the forging process, the magnesium alloy comes to have a smaller average crystal grain size than the alloy yet to be forged. The forged magnesium alloy preferably has an average crystal grain size of about 150 μm or less, for example. By defining the average crystal grain size to be about 150 μm or less, a forged product can gain as high mechanical strength as an aluminum alloy cast product which has been subjected to a T6 heat treatment.

Furthermore, the upper bracket 100 that has been subjected to the forging process preferably includes a portion in which the magnesium alloy preferably has an average crystal grain size of about 100 μm or less. The bosses (through hole making portions) 2a and 2b with a fastening portion and the center boss (through hole making portion) 2c, to which a steering shaft will be inserted, undergo a lot of stress (i.e., should have a great strength to bear a heavy load). That is why by setting the average crystal grain size of these portions to be about 100 μm or less, their mechanical strength can be further increased.

It should be noted that the present invention is in no way limited to the handlebar supporting members described above but is applicable for use in any forged product with a through hole. However, the workpiece is particularly likely to be deformed and cause chipping accordingly in an arrangement in which in a plan view, the through hole making portion is located outside of the bottom portion with respect to the center of the forged product. That is why the present invention is preferably applied to such a forged product. The present invention can be used effectively in the handlebar supporting member, for example, because the through hole making portion with the through hole, to which a front fork will be inserted, is located outside of the bottom portion in a plan view.

Hereinafter, a method of making an upper bracket 100 according to this preferred embodiment will be described with reference to FIGS. 5A through 5D, which are cross-sectional views schematically illustrating the respective process steps to make the upper bracket 100.

Figure 5A:
FIGS. 5A through 5D are cross-sectional views schematically illustrating respective process steps to make the upper bracket 100.

First, as shown in FIG. 5A, a workpiece 11 of a magnesium alloy is prepared. The magnesium alloy may have any of various compositions but preferably includes about 10 mass % or less of aluminum, for example. This is because if the aluminum content exceeded about 10 mass %, a β phase would nucleate to decrease not only the forgeability but also the toughness of the forged product as well. Also, the magnesium alloy preferably includes about 2 mass % or more of aluminum, for example, because if the aluminum content were less than about 2 mass %, the solidifying temperature range would broaden so much as to cause casting defects easily when the workpiece 11 is prepared by casting. Examples of magnesium alloys with an aluminum content of about 2 mass % to about 10 mass % include AZ31, AZ61 and AZ91 with compositions shown in the following Table 1:

TABLE 1

|  | Al | Zn | Mn | Fe | Si | Ni | Mg |
|---|---|---|---|---|---|---|---|
| AZ31 | 3.1 | 0.8 | 0.2 | 0.003 | 0.003 | 0.002 | Bal. |
| AZ61 | 5.8 | 0.9 | 0.2 | 0.003 | 0.003 | 0.002 | Bal. |
| AZ91 | 8.9 | 0.9 | 0.1 | 0.005 | 0.003 | 0.002 | Bal. | where every numeral is shown in mass percentage and "Bal." means the "balance".

When viewed in the direction in which the workpiece 11 is pressed in the step of forging, the workpiece 11 prepared in this step of preparing preferably has substantially the same profile as the workpiece 11 that has been forged in the step of forging. In this manner, by preparing a workpiece 11 that has substantially the same profile as the workpiece that has been forged when viewed in the forging direction, the forging process needs to be performed a decreased number of times (e.g., only once). As a result, the number of manufacturing process steps to be done and the manufacturing cost can be reduced. In addition, since the amount of bur left decreases, the material yield may be increased with the manufacturing cost reduced. Such a workpiece 11 may have been formed by subjecting a cast material to an extrusion process, for example. A workpiece 11 formed by an extrusion process has its crystal grain size decreased by the extrusion process, and therefore, has a higher degree of forgeability.

Figure 5B:
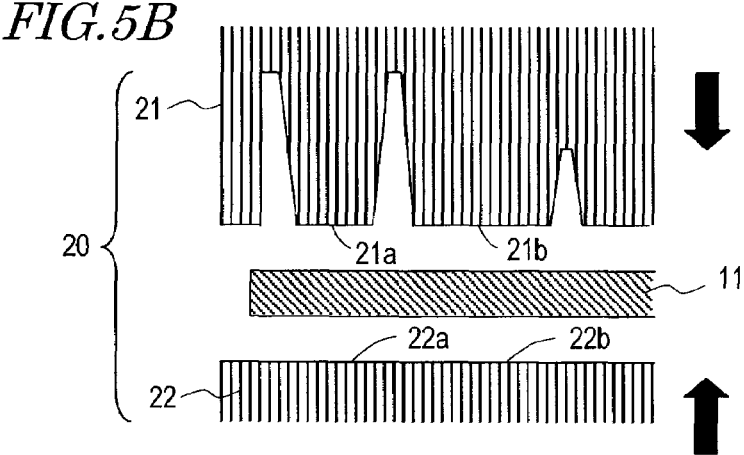
Figure 5C:
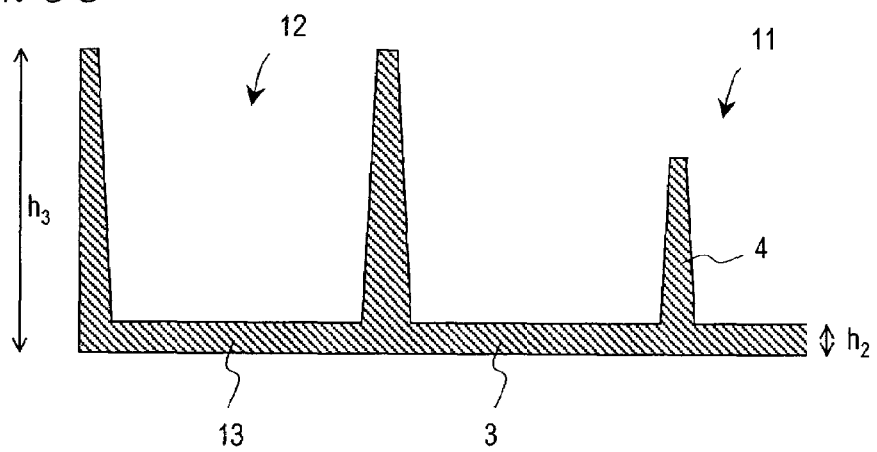

Next, as shown in FIG. 5B, the workpiece 11 is forged with a forging die 20, thereby forming a workpiece 11 including a non-through hole 12, a bottom portion 3 that lies on a plane intersecting with the direction in which the non-through hole 12 runs, and a raised portion 4 that protrudes out of the bottom portion 3 as shown in FIG. 5C. This forging step is carried out such that the portion 13 at the bottom of the non-through hole 12 is substantially on a level with the bottom portion 3.

Figure 5D:
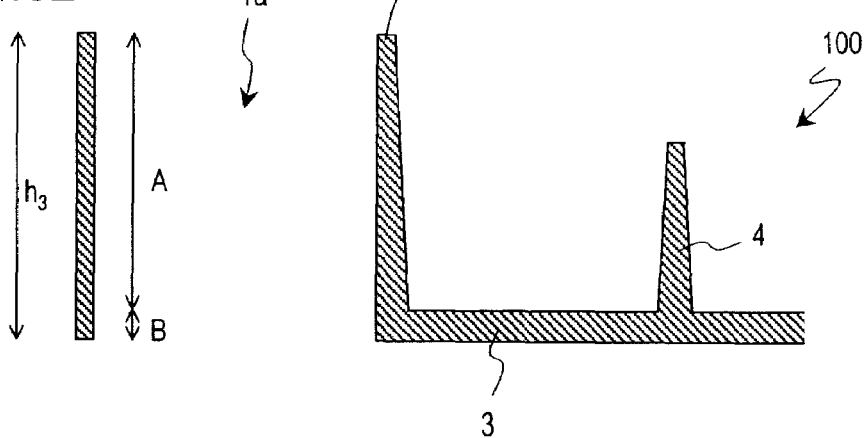
Figure 6:
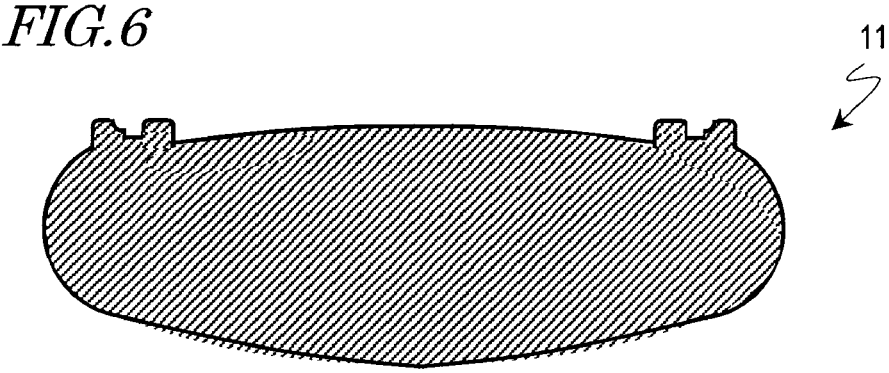
FIG. 6 is a top view illustrating an example of a workpiece prepared in the step of preparing.

Thereafter, a portion of the workpiece 11 that has been forged in this manner (more specifically, that portion 13 at the bottom of the non-through hole 12) is removed, thereby turning the non-through hole 12 into a through hole 1a as shown in FIG. 5D. This process step of making a through hole may be performed by machining, for example. After that, a surface treatment is performed if necessary. In this manner, an upper bracket 100 can be obtained.

In the manufacturing process described above, the step of forging is carried out such that the portion 13 to be removed in the step of making a through hole is substantially on a level with the bottom portion 3. Thus, there will be almost no time lag between when the press surface for forming the non-through hole 12 contacts with the workpiece 11 and when the press surface for forming the bottom portion 3 contacts with the workpiece 11. More specifically, as can be seen from FIG. 5B, the press surface 21a of the upper punch 21 for making the non-through hole 12 and the press surface 21b of the upper punch 21 for forming the bottom portion 3 contact with the workpiece 11 at substantially the same time. Likewise, the press surface 22a of the lower punch 22 for making the non-through hole 12 and the press surface 22b of the lower punch 22 for forming the bottom portion 3 also contact with the workpiece 11 at substantially the same time. Consequently, the unwanted deformation of the workpiece 11 can be reduced, the press tonnage required to get the forging process done can also be reduced, and the durability of the die can be increased. In addition, chipping can be minimized and the material yield can be increased.

It should be noted that the step of forging does not always have to be carried out such that the portion 13 to be removed in the step of making a through hole is substantially on a level with the bottom portion 3. As long as that portion 13 to be removed in the step of making a through hole has been shifted toward the bottom portion 3 with respect to the middle of the through hole in the direction in which the through hole 1a runs, there will be a shorter time lag between when the press surface contacts with the workpiece 11 to make the non-through hole 12 and when the press surface contacts with the workpiece 11 to form the bottom portion 3. As a result, the deformation of the workpiece 11 can be reduced effectively.

The step of forging is preferably carried out at an upset ratio of about 60% or more, for example. As used herein, the "upset ratio" is the deformation ratio (or a percentage representing a decrease in height) of the workpiece 11 in the press direction. Supposing the height of the workpiece 11 yet to be forged is $h_1$ (see FIG. 5A) and the basic height of the forged workpiece 11 (which is defined by the height of the bottom portion 3) is $h_2$ (see FIG. 5C), the upset ratio R (%) may be represented as $R=(h_1-h_2)/h_1 \times 100$.

By defining the upset ratio (fractional reduction in upsetting height) to be about 60% or more, the average crystal grain size of the magnesium alloy can be reduced sufficiently. As a result, a forged product can gain as high mechanical strength as an aluminum alloy cast product which has been subjected to a T6 heat treatment.

To reduce the average crystal grain size of the magnesium alloy sufficiently by causing a good plastic deformation of the workpiece 11, the step of forging is preferably performed such that the forged workpiece 11 has a thickness of about 1 mm to about 8 mm and that a portion of the forged workpiece 11 has a deformation height of about 130% or more, for example. Supposing the height of each portion of the forged workpiece 11 is $h_3$ (which is the height of the through hole making portion 2a in FIG. 5C), the deformation height H (%) of each portion of the workpiece 11 is calculated by $H=(h_3/h_1) \times 100$.

The present inventors carried out experiments to know how often chipping occurred in the upper bracket 100 that was made by the manufacturing process of this preferred embodiment (representing a specific example of the present invention) and in upper brackets that were made by other processes (representing Comparative Examples #1 and #2). The results are shown in the following Table 2. Comparative Example #1 is an upper bracket that was made by the same method as the specific example of the present invention except that a casting die was designed to form the punched portion B at the middle of the through hole in the axial direction X as shown in FIG. 3A. On the other hand, Comparative Example #2 is an upper bracket that was made by performing the three process steps of upsetting forging, coarse forging and finish forging using a casting die, which had also been designed to form the punched portion B at the middle of the through hole in the axial direction X, and a cylindrical bar workpiece.

The present inventors carried out experiments on the frequency of occurrence of chipping with the ratio of the volume of the forged product to that of the workpiece (i.e., the yield) changed in each of the specific example of the present invention and comparative examples #1 and #2. The results are shown in the following Table 2:

TABLE 2

| | Location of punched portion | Yield (volume of forged product/volume of workpiece) | Upset ratio | Did chipping occur? |
| --- | --- | --- | --- | --- |
| Specific Example | Closer to bottom with respect to middle | 95% | 60% | NO |
| | | 90% | 62% | NO |
| | | 80% | 66% | NO |
| Comparative Example 1 | Middle | 80% | 66% | YES |
| | | 70% | 70% | NO |
| Comparative Example 2 | Middle | 50% | 85% | YES |
| | | 30% | 88% | NO |

As can be seen from this Table 2, chipping occurred when the yield was about 80% or more in Comparative Example #1 and when the yield was about 50% or more in Comparative Example #2. In contrast, in the specific example of a preferred embodiment of the present invention, no chipping occurred at all at any yield of approximately 80%, 90% or 95%. In other words, a high yield of about 95% was achieved with the occurrence of chipping prevented.

Next, the following Table 3 shows the press tonnage to get the forging process done, the number of times the forging process should be repeated, and the die's durability in each of the specific example and Comparative Examples #1 and #2:

TABLE 3

| | Press tonnage to get forging done | Number of times of repetition of forging process | Die durability |
| --- | --- | --- | --- |
| Specific Example | 800 t | 1 | 10,000 shots |
| Comparative Example #1 | 1,080 t | 1 | 4,000 shots |
| Comparative Example #2 | 1,520 t | 3 | 4,000 shots |

As can be seen from the results shown in Table 3, the specific example of the present invention needed a smaller press tonnage to get the forging process done, and exhibited better die durability compared to Comparative Examples #1 and #2. Moreover, the specific example of a preferred embodiment of the present invention required a smaller number of times of repetition of the forging process compared to Comparative Examples #2.

The results shown in these Tables 2 and 3 reveal that the manufacturing process of this preferred embodiment could decrease the press tonnage required to get the forging process done, increase the die durability and increase the material yield with the occurrence of chipping prevented.

Furthermore, the manufacturing process of this preferred embodiment is applicable to making not just a forged product of a magnesium alloy but also a forged product of any of various other metallic materials. Nevertheless, since a magnesium alloy is an expensive material, the manufacturing process of this preferred embodiment is particularly effectively applicable to making a forged product of a magnesium alloy.

Figure 7:
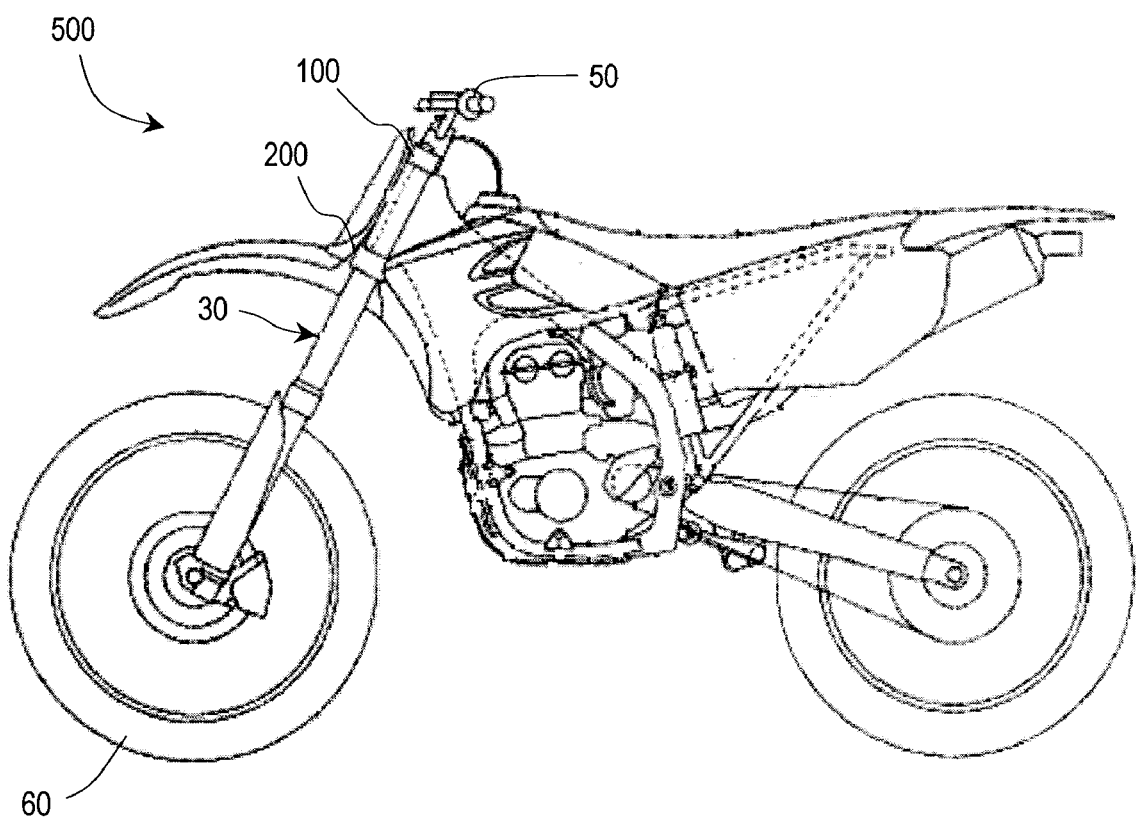
FIG. 7 is a side view schematically illustrating a motorcycle 500 including the upper bracket 100.
Figure 8:
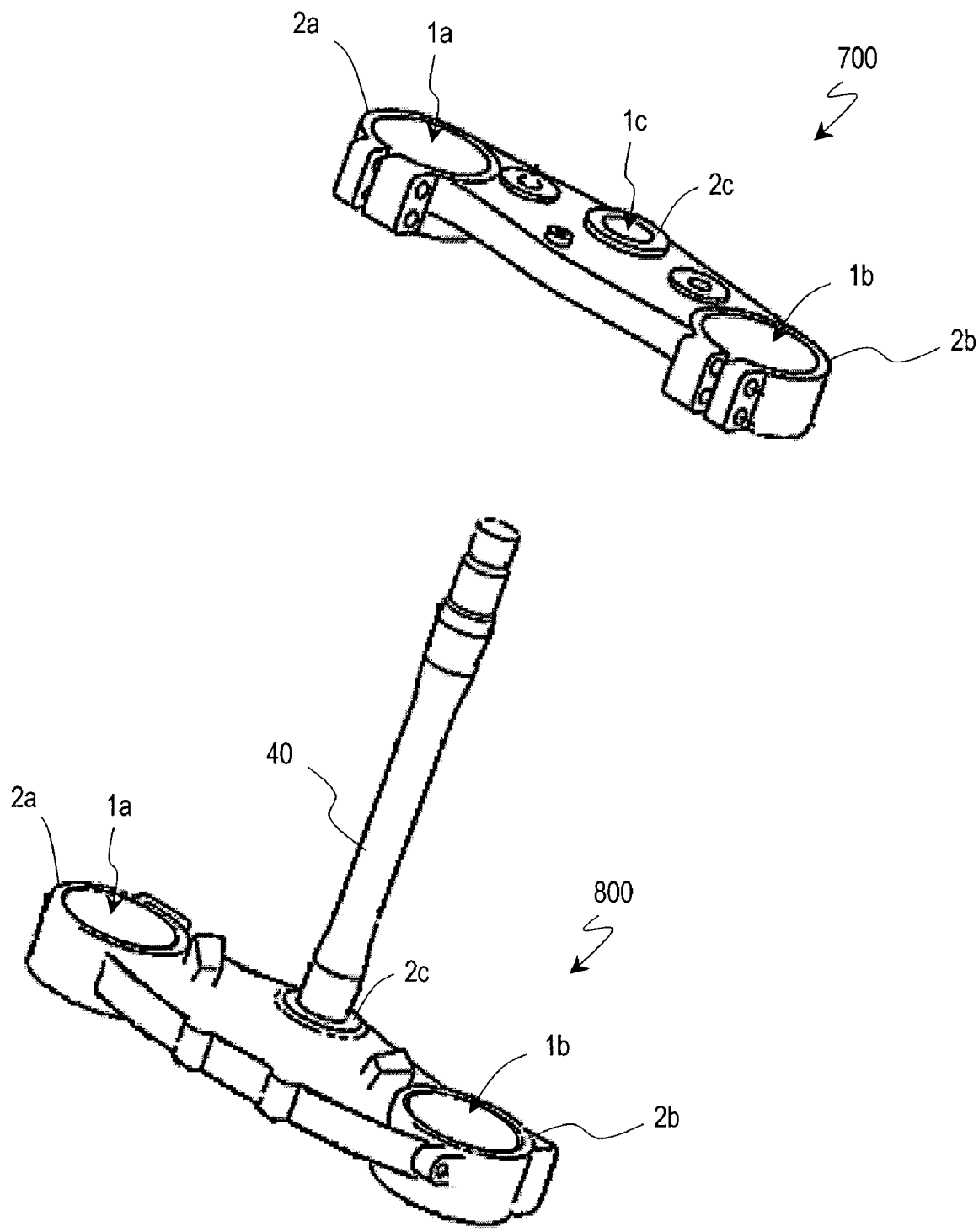
FIG. 8 is a perspective view schematically illustrating conventional upper and under brackets.
Figure 9:
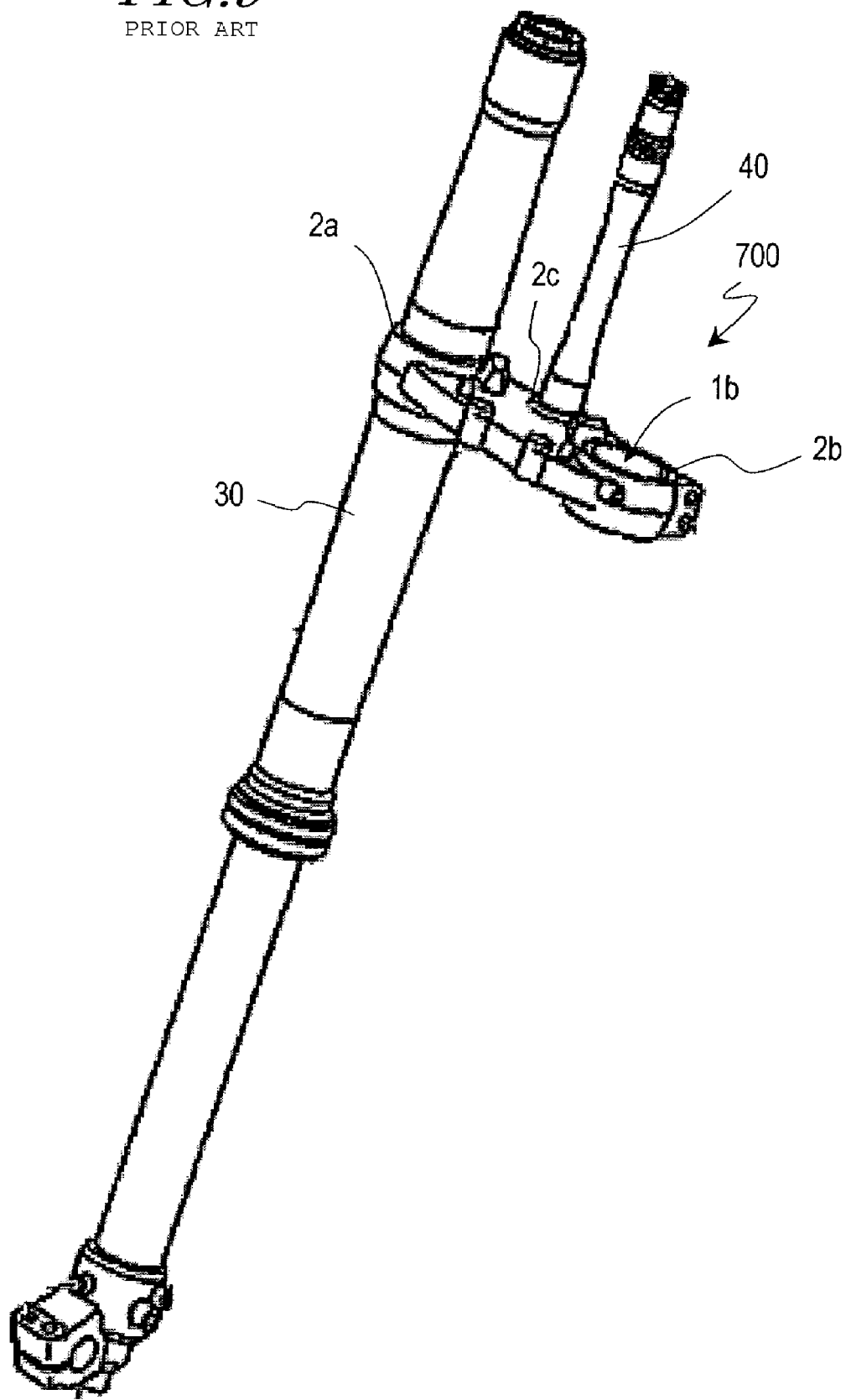
FIG. 9 is a perspective view schematically illustrating the conventional upper bracket.

FIG. 7 illustrates an example of a motorcycle with magnesium alloy handlebar supporting members made by the manufacturing process of this preferred embodiment.

The motorcycle 500 shown in FIG. 7 includes an upper bracket 100 and an under bracket 200, which were made of a magnesium alloy by the manufacturing process of this preferred embodiment. Since a front fork 30 and a steering shaft (not shown) are supported by the upper bracket 100 and the under bracket 200, the rider can turn a front wheel 60 with handlebars 50.

The motorcycle 500 shown in FIG. 7 includes the upper bracket 100 and under bracket 200 that were made of a magnesium alloy by the manufacturing process of this preferred embodiment, and can have a lighter weight with the increase in manufacturing cost minimized.

According to preferred embodiments of the present invention, while a forged product with a through hole is being made, an unexpected deformation of the workpiece can be reduced during the forging process.

The present invention is particularly effectively applicable to a forged product made of a magnesium alloy and a method of making such a product. A forged product according to preferred embodiments of the present invention may be used effectively as a handlebar supporting member for motorcycles, for example.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Application No. 2006-342199 filed on Dec. 20, 2006, the entire contents of which are hereby incorporated by reference. Furthermore, the entire contents of Japanese Patent Application No. 2007-314204 filed on Dec. 5, 2007, are hereby incorporated by reference.

What is claimed is:

1. A forged product made of a magnesium alloy, the product comprising:
    a through hole making portion that defines a through hole that runs in a predetermined direction; and
    a bottom portion that lies on a plane intersecting with the predetermined direction, the bottom portion of the forged product having a thickness defined by a distance from a top surface of the bottom portion to a bottom surface of the bottom portion; wherein
    the through hole includes a first portion that has been formed by a forging process and a second portion that has been formed by removing a bottom of the through hole after the forging process; and
    a position of the second portion of the through hole is shifted toward the bottom portion with respect to a middle of the through hole in the predetermined direction; wherein
    the second portion of the through hole is substantially on a level with the bottom portion of the forged product; and
    a thickness of the second portion of the through hole is substantially equal to the thickness of the bottom portion.

2. The forged product of claim 1, wherein a distance from the middle of the through hole in the predetermined direction to the second portion of the through hole accounts for more than about 70% of the distance from the middle of the through hole in the predetermined direction to the bottom portion.

3. The forged product of claim 1, wherein as viewed on a plane that intersects with the predetermined direction, the through hole making portion is located outside of the bottom portion with respect to the center of the forged product.

4. The forged product of claim 1, wherein the magnesium alloy has an average crystal grain size of about 150 μm or less.

5. The forged product of claim 1, wherein the product comprises a portion in which the magnesium alloy has an average crystal grain size of about 100 μm or less.

6. The forged product of claim 1, wherein the magnesium alloy includes about 10 mass % or less of aluminum.

7. The forged product of claim 1, wherein the through hole making portion is a boss with a sidewall that surrounds the through hole, and the forged product is a handlebar supporting member for motorcycles.

8. A motorcycle including the forged product of claim 1.

9. A handlebar supporting member for motorcycles, the member having been formed by a forging process and comprising:
    a boss with a through hole that runs in a predetermined direction; and
    a bottom portion that lies on a plane intersecting with the predetermined direction, the bottom portion of the forged product having a thickness defined by a distance from a top surface of the bottom portion to a bottom surface of the bottom portion; wherein
    the through hole includes a first portion that has been formed by the forging process and a second portion that has been formed by removing a bottom of the through hole after the forging process; and
    a position of the second portion of the through hole is shifted toward the bottom portion with respect to a middle of the through hole in the predetermined direction; wherein
    the second portion of the through hole is substantially on a level with the bottom portion of the forged product; and
    a thickness of the second portion of the through hole is substantially equal to the thickness of the bottom portion.

10. A method of making a forged product, the method comprising the steps of:
    preparing a workpiece made of a metallic material;
    forging the workpiece such that the workpiece has a non-through hole running in a predetermined direction and a bottom portion lying on a plane that intersects with the predetermined direction, the bottom portion of the workpiece having a thickness defined by a distance from a top surface of the bottom portion to a bottom surface of the bottom portion; and
    removing a portion of the forged workpiece, thereby turning the non-through hole into a through hole; wherein
    the step of forging is performed such that the portion of the workpiece to be removed in the step of removing has been shifted toward the bottom portion with respect to the middle of the through hole in the predetermined direction;
    the non-through hole is substantially on a level with the bottom portion of the workpiece; and
    a thickness of the non-through hole is substantially equal to the thickness of the bottom portion.

11. The method of claim 10, wherein as viewed in a direction in which the workpiece is pressed in the step of forging, the workpiece prepared in the step of preparing has substantially the same profile as the workpiece that has been forged in the step of forging.

12. The method of claim 11, wherein the step of preparing the workpiece includes forming the workpiece by an extrusion process.

13. The method of claim 10, wherein the step of preparing the workpiece includes preparing a workpiece made of a magnesium alloy.

14. The method of claim 13, wherein the step of forging includes forging the workpiece at an upset ratio of about 60% or more.

15. The method of claim 13, wherein the step of forging includes forging the workpiece such that the forged workpiece has a thickness of about 1 mm to about 8 mm.

16. The method of claim 13, wherein the step of forging includes forging the workpiece such that a portion of the forged workpiece has a deformation height of about 130% or more.

17. The forged product of claim 1, wherein a top surface of the second portion is substantially on a level with the top surface of the bottom portion, and a bottom surface of the second portion is substantially on a level with the bottom surface of the bottom portion.

18. The handlebar supporting member of claim 9, wherein a top surface of the second portion is substantially on a level with the top surface of the bottom portion, and a bottom surface of the second portion is substantially on a level with the bottom surface of the bottom portion.

19. The method of claim 10, wherein a top surface of the non-through hole is substantially on a level with the top surface of the bottom portion, and a bottom surface of the non-through hole is substantially on a level with the bottom surface of the bottom portion.

* * * * *